United States Patent
Valiyambath Krishnan et al.

(10) Patent No.: US 10,451,368 B2
(45) Date of Patent: Oct. 22, 2019

(54) DEVICE AND METHOD FOR GENERATING STEAM COMPRISING A CONTAINER FOR COLLECTING SCALE FLAKES

(71) Applicant: KONINKLIJKE PHILIPS N.V., Eindhoven (NL)

(72) Inventors: Mohankumar Valiyambath Krishnan, Eindhoven (NL); Yen Leng Pang, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 10 days.

(21) Appl. No.: 15/763,858

(22) PCT Filed: Nov. 4, 2016

(86) PCT No.: PCT/EP2016/076663
§ 371 (c)(1),
(2) Date: Mar. 28, 2018

(87) PCT Pub. No.: WO2017/084893
PCT Pub. Date: May 26, 2017

(65) Prior Publication Data
US 2018/0283817 A1    Oct. 4, 2018

(30) Foreign Application Priority Data

Nov. 17, 2015 (EP) .................... 15194867

(51) Int. Cl.
*F28G 13/00* (2006.01)
*D06F 87/00* (2006.01)
(Continued)

(52) U.S. Cl.
CPC .......... *F28G 13/005* (2013.01); *B01D 35/02* (2013.01); *B01D 35/16* (2013.01); *B08B 3/106* (2013.01);
(Continued)

(58) Field of Classification Search
CPC .......... F22B 37/48; F22B 37/60; F22B 1/287; F22B 1/288; F22B 1/284; F22B 27/14;
(Continued)

(56) References Cited

U.S. PATENT DOCUMENTS

| 345,416 A | * | 7/1886 | Douglas | ............... A61H 33/063 122/39 |
| RE24,278 E | * | 2/1957 | Alexander | ............ F22B 13/005 122/155.5 |

(Continued)

FOREIGN PATENT DOCUMENTS

| CN | 201873882 U | 6/2011 |
| DE | 102010061029 A1 | 6/2012 |

(Continued)

*Primary Examiner* — Steven S Anderson, II

(57) ABSTRACT

The invention relates to a device (1) for generating steam. The device (1) comprises a first plate (2) being inclined at a positive first angle (A0) compared to the horizontal direction (H) to define a first upper end (2a) and a first lower end (2b), a heating element (3) to heat the first plate (2) to a predetermined temperature being at least above water evaporation temperature, a water inlet arrangement (4) for dispensing water onto the first plate (2), a second plate (5) being inclined at a negative second angle (B0) compared to the horizontal direction (H) to define a second upper end (5a) and a second lower end (5b), the second upper end (5a) adjoining the first lower end (2b), and a container (6) extending at least below said first lower end (2b), said container (6) being arranged for collecting scale flakes falling from the first plate (2). This solution allows creating a larger volume for the collection of scale, thus increasing the operating life of the device (1).

14 Claims, 7 Drawing Sheets

(51) Int. Cl.
*B01D 35/16* (2006.01)
*D06F 75/06* (2006.01)
*B01D 35/02* (2006.01)
*B08B 3/10* (2006.01)
*B08B 3/14* (2006.01)
*B08B 7/00* (2006.01)
*F22B 1/28* (2006.01)
*F22B 37/60* (2006.01)
*F22B 27/14* (2006.01)
*F22B 27/16* (2006.01)

(52) U.S. Cl.
CPC .............. *B08B 3/14* (2013.01); *B08B 7/0064* (2013.01); *D06F 75/06* (2013.01); *D06F 87/00* (2013.01); *F22B 1/284* (2013.01); *F22B 1/287* (2013.01); *F22B 1/288* (2013.01); *F22B 27/14* (2013.01); *F22B 27/165* (2013.01); *F22B 37/60* (2013.01); *B08B 2203/007* (2013.01)

(58) Field of Classification Search
CPC ....... F22B 27/165; B01D 35/16; B01D 35/02; B01D 35/027; B01D 35/0273; B01D 35/0276; F28G 13/005; D06F 75/10; D06F 75/06; D06F 75/12; D06F 75/18; D06F 75/20; D06F 87/00; B08B 3/106; B08B 7/0064; B08B 2203/007
See application file for complete search history.

(56) References Cited

U.S. PATENT DOCUMENTS

| | | | |
|---|---|---|---|
| 4,091,551 A * | 5/1978 | Schaeffer | D06F 75/18 38/77.83 |
| 4,476,021 A * | 10/1984 | Souza | B01D 35/02 210/248 |
| 5,345,704 A * | 9/1994 | Guillot | D06F 75/18 38/77.83 |
| 2003/0010482 A1* | 1/2003 | Hansen | A61F 7/0085 165/168 |
| 2004/0264644 A1 | 12/2004 | Goebel | |
| 2009/0190720 A1 | 7/2009 | Windt | |
| 2013/0125940 A1 | 5/2013 | Morgan | |
| 2016/0370000 A1* | 12/2016 | Chua | D06F 75/18 |

FOREIGN PATENT DOCUMENTS

| | | | |
|---|---|---|---|
| EP | 0395843 | A2 | 11/1990 |
| EP | 2584089 | A1 | 4/2013 |
| EP | 2584090 | A2 | 4/2013 |
| JP | 2010051469 | A1 | 3/2010 |
| JP | 2011112561 | A | 6/2011 |
| WO | 2013124640 | A1 | 8/2013 |
| WO | 2015010968 | A1 | 1/2015 |
| WO | 2015010969 | A1 | 1/2015 |
| WO | 2015010971 | A1 | 1/2015 |

* cited by examiner

DEVICE AND METHOD FOR GENERATING STEAM COMPRISING A CONTAINER FOR COLLECTING SCALE FLAKES

This application is the U.S. National Phase application under 35 U.S.C. § 371 of International Application No. PCT/EP2016/076663, filed on Nov. 4, 2016 and International Application No. 15194867.6 filed on Nov. 17, 2015. These applications are hereby incorporated by reference herein.

FIELD OF THE INVENTION

The present invention relates to a steam generation device, in particular to a steam generation device that allows collecting scale flakes.

The invention has some applications in the field of domestic appliances using water evaporation, such as garment care field.

BACKGROUND OF THE INVENTION

In areas with hard water, when steam ironing is carried out for long periods of time or when steam ironing is carried out frequently, the steam generator of the steam appliance involved tends to get filled with scale within a relatively short period of time, thus significantly reducing the operating life of the steam generator.

OBJECT AND SUMMARY OF THE INVENTION

It is an object of the invention to propose a device for generating steam that avoids or mitigates above-mentioned problems.

The invention is defined by the independent claims. The dependent claims define advantageous embodiments.

According to one aspect of the present invention, there is provided a device for generating steam. The device may comprise a first plate being inclined at a positive first angle (A0) compared to the horizontal direction (H) to define a first upper end and a first lower end. The device may further comprise a heating element to heat the first plate to a predetermined temperature being at least above water evaporation temperature. The device may also comprise a water inlet arrangement for dispensing water onto the first plate. The device comprises a second plate being inclined at a negative second angle (B0) compared to the horizontal direction (H) to define a second upper end and a second lower end, the second upper end adjoining the first lower end of the first plate. The device further comprise a container extending at least below the first lower end. The container is arranged for collecting scale flakes falling from the first plate.

By having a first plate inclined at a positive angle to the horizontal direction and a second plate inclined at a negative angle to the horizontal direction, a recess is formed below the first plate by the second plate. The recess allows more space for the collection and accumulation of scale, which may thus increase the operating life of the device without increasing the footprint size of the device (thereby enabling a compact device).

The first plate may be joined to the second plate to form a protrusion.

Dispensing water onto an angled heated first plate causes water to form a thin film and evaporate more quickly than if the first plate were horizontal. The water may be dispensed onto the first plate proximate the first upper end. As the film of water being fed onto the first plate is cold relative to the heated surface of the first plate, any scale on the first plate will be subjected to thermal shock. That is, the cooling effect of the water (at least until it evaporates) and the heating effect of the surface of the first plate will induce thermal stresses and strains in any scale that has formed on the surface and cause it to break apart and dislodge from the surface. The inclination angle of the first plate's surface causes the dislodged scale to travel down the first plate's surface toward the lower end of the first plate (i.e. the first lower end) and, fall off the first lower end into the container. The steep angle of the first plate's surface ensures that water is continuously moved over the first plate's surface by the action of gravity.

Preferably, the container comprises collecting means for retaining scale flakes while allowing water to filter through. The collecting means allow for accumulation of scale while allowing water to pass through.

Preferably, the collecting means may be any one selected from a group consisting of a perforated plate, a perforated sheet, and a mesh. The water that passes through the collecting means may be collected and be heated to generate steam. The container may comprises a bottom portion (below the collecting means) for collecting the water.

Preferably, the second upper end and the first lower end form a protrusion from where scale flakes fall off into the container.

The device may comprise a heater for generating heat for evaporating water collected by the container into steam.

Alternatively or additionally, the device may comprise a thermal conduction mechanism for conducting heat to the container from at least one of the heating element and the first plate. The thermal conduction mechanism allows water collected in the container to be heated or to be heated more rapidly for generation of steam.

Preferably, the container may be removeable, and the device further comprises an attachment mechanism to reversibly attach the container to the device. The attachment mechanism may allow the container to be secured with the device when the device is in operation for collection of scale. The attachment mechanism may also allow the container to be easily detached from the device when the user wishes to remove the scale collected from the container.

Preferably, the attachment mechanism is adapted to seal the container with the device when the container is attached to the device. Preferably, the first plate has at least one channel extending between the first upper end and the first lower end.

When water is dispensed onto a heated first plate it forms a film, the direction of travel of the film relative to the plate is determined by a combination of the surface tension of the water and gravity. The effect of surface tension can cause the water to migrate transversely across the first plate's surface so that separate rivulets gather and form a thicker film. The presence of channels prevents the water from running to one side and forming a thick rivulet (which requires the device to have a long evaporation length) if the device happens to be tilted during operation; the water is instead guided down the channel(s) and form a thinner film which will evaporate more quickly than if a thicker film is allowed to form. Furthermore, the increased rate of evaporation means that the distance between the upper end and the lower end of the heated first plate can be reduced for any given quantity of water dispensed.

Preferably, the water inlet arrangement comprises multiple water inlets to dispense water onto multiple regions of the first plate. The water may be dispensed on the first plate proximate the first upper end.

If water is fed to multiple regions of the first plate's surface, the water being fed onto the surface will cool the surface in those regions and will also cool any scale which has formed on the surface in those regions. Therefore, the scale will be cooled at different rates which will assist in inducing thermal shock which will act to break apart the scale.

Alternatively, the water inlet arrangement may comprises a water distribution means, such as water guiding structure(s), to distribute water across a substantial width of the first plate. For instance, the water distribution means may be adapted to distribute water across at least 60% of the width of the first plate.

Preferably, according to one aspect of the present invention, there is provided a steaming appliance comprising a device for generating steam as described herein. The steaming appliance may alternatively be referred to as a steamer appliance or a steam appliance or a steam generating appliance.

Preferably, the steaming appliance may comprises a water pump to deliver water to the water inlet arrangement. The steaming appliance may further comprise a control unit for controlling the water flow rate delivered to the water inlet arrangement in dependence on the predetermined temperature. The steaming appliance may also comprise a reservoir for storing the water before the water is directed by the water pump to the water inlet arrangement.

Preferably, the container further comprises an exterior surface with a handling mechanism, the handling mechanism being adapted to allow an user to remove the container from the appliance. The handling mechanism, e.g. a handle or a grip, allows the user to remove the container from the appliance with greater ease.

Preferably, the steaming appliance further comprises a housing. The external surface of the container may be substantially flush with an outer surface of the housing when the container is attached to the device.

According to another aspect of the present invention, there is provided a method of collecting scale flakes in a device for generating steam. The method may comprise heating a first plate inclined at a positive first angle (A0) compared to the horizontal direction (H), the first plate being heated to a predetermined temperature being at least above water evaporation temperature, the first plate defining a first upper end and a first lower end, the first lower end adjoining a second upper end of a second plate that is inclined at a negative second angle (B0) compared to the horizontal direction (H).

The method may further comprise dispensing water on the first plate.

The method may additionally comprise collecting in a container the scale flakes, the container extending at least below the first lower end.

These and other aspects of the invention will be apparent from and elucidated with reference to the embodiments described hereinafter.

BRIEF DESCRIPTION OF THE DRAWINGS

Embodiments of the invention will now be described, by way of example only, with reference to the accompanying drawings in which.

DETAILED DESCRIPTION OF THE EMBODIMENTS

Figure 1:
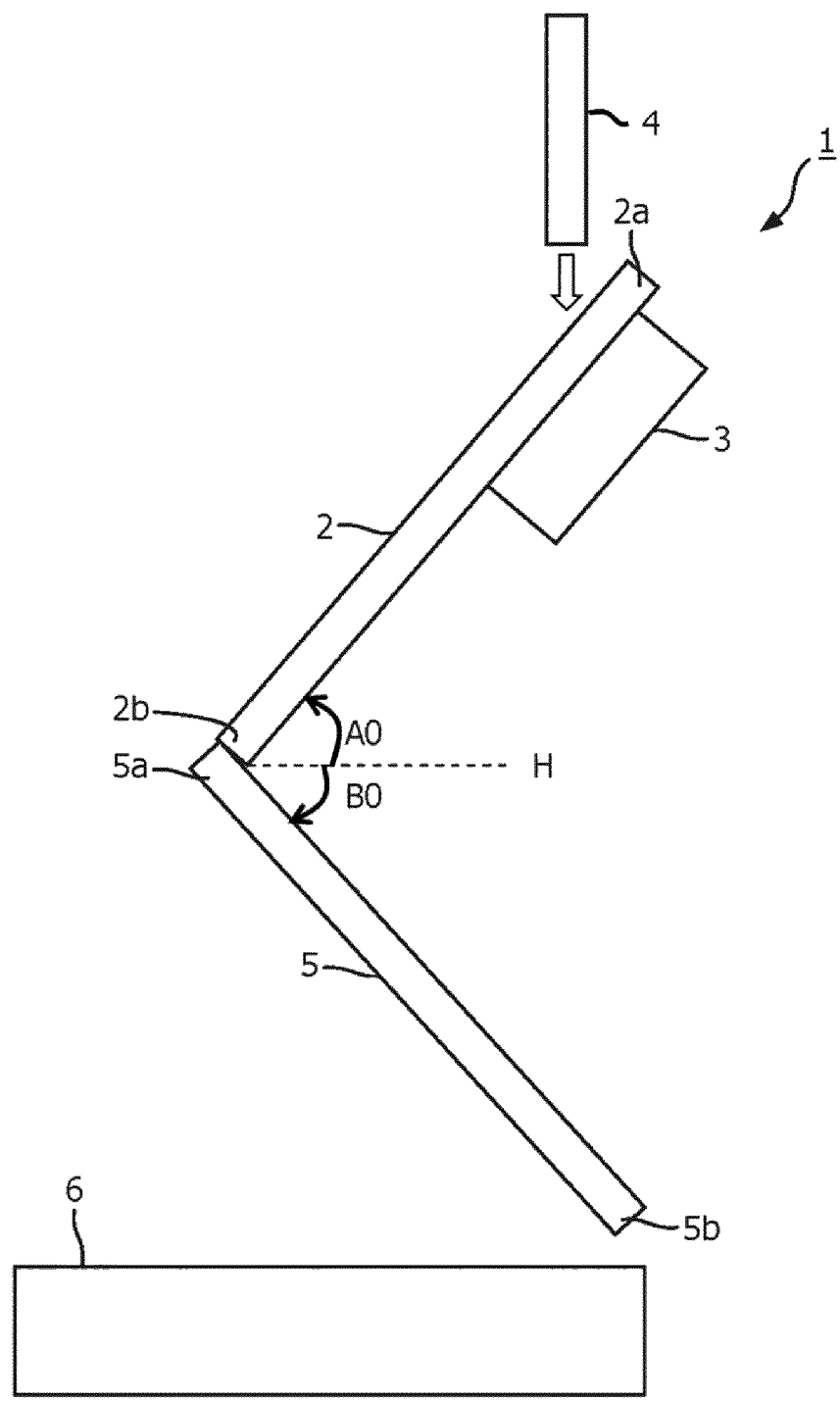
FIG. 1 shows a schematical and partial representation of a cross-sectional side view of a device for generating steam according to an embodiment of the present invention.

FIG. 1 shows a schematical and partial representation of a cross-sectional side view of a device (1) for generating steam according to an embodiment of the present invention. The device (1) comprises a first plate (2) being inclined at a positive first angle (A0) compared to the horizontal direction (H) to define a first upper end (2a) and a first lower end (2b). The device also comprises a heating element (3) to heat the first plate (2) to a predetermined temperature being at least above water evaporation temperature. For example, the predetermined temperature is in the range 100-300 degrees Centigrade. The device additionally comprises a water inlet arrangement (4) for dispensing water onto the first plate (2). The device further comprises a second plate (5) being inclined at a negative second angle (B0) compared to the horizontal direction (H) to define a second upper end (5a) and a second lower end (5b), the second upper end (5a) adjoining the first lower end (2b) of the first plate (2). The device (1) further comprises a container (6) extending at least below said first lower end (2b), said container (6) being arranged for collecting the scale flakes falling from the first plate (2).

The angles (A0) and (B0) are in the range 0-90 degrees. For example, value of angle (A0) is 60 degrees, and value of angle (B0) is 60 degrees.

The first plate (2) and the second plate (5) may be portions of a single body or structure, for instance a casting or formed body. The first plate (2) and the second plate (5) may be joined together to form an integral body or structure.

Figure 2:
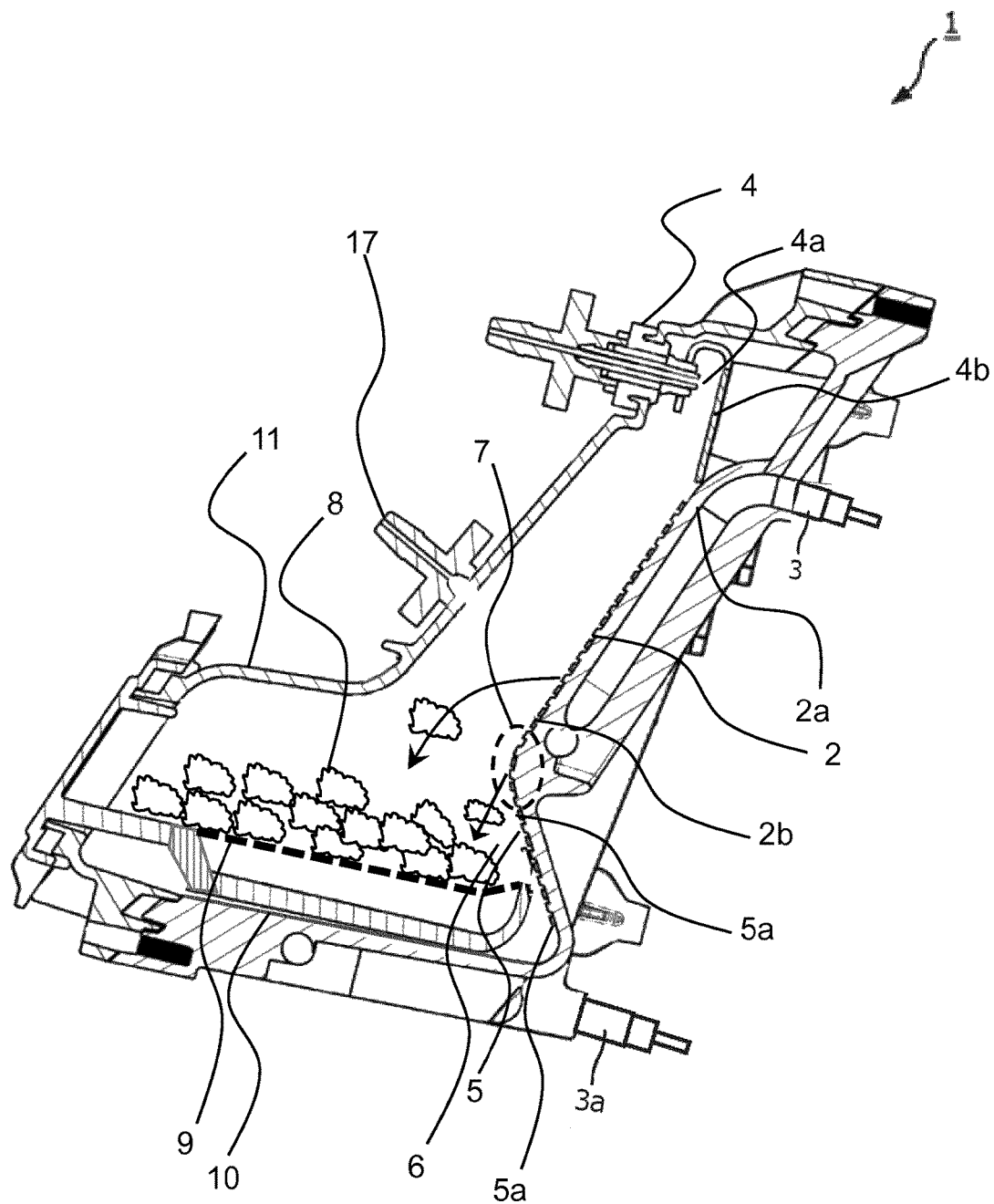
FIG. 2 shows a cross-sectional side view of a device for generating steam according to another embodiment of the present invention.

The first plate (2) and the second plate (5) are in contact so as to form an arrangement wherein the cumulated angle A0+B0 formed between the first plate (2) and the second plate (5) is less than 180°. The heating element (3) is used to heat up the first plate (2). The heating element (3) extends adjacent to the first plate (2). The heating element (3) extends over a surface smaller than the surface of the first plate (2), as illustrated in FIG. 2, or over a surface almost as large as the surface of the first plate (2). The water inlet arrangement (4) is provided to dispense water onto the first plate (2). Scale is formed by minerals in the water on the first plate (2). The repeated heating (provided by heater (3)) and cooling (when water is dispensed on first plate (2)) causes scale to flake off. The scale flakes are transported down the first plate (by means such as water, steam, and/or gravity). When the scale flakes reach the first lower end (2b) (or second upper end (5a)), the scale flakes fall (due to gravity) in the container (6) positioned vertically beneath the first lower end (2b) (or second upper end (5a)).

The first plate (2) may form an inclined surface while the second plate (5) may form a reverse inclined surface. The device (1) may be a steam generator.

Steam which is generated by the evaporation of water exits the device (1) via a steam outlet (17), for example located facing the first plate (2).

The water may be dispensed onto the first plate (2) proximate said first upper end (2a). The heating element (3) may be referred to as a heater, vice versa.

The water evaporation temperature depends on the pressure inside the steam generator before or during steaming. The water evaporation temperature may be from about 90 to about 120° C., e.g. from about 95 to 105° C., e.g. about 100° C.

Figure 5:
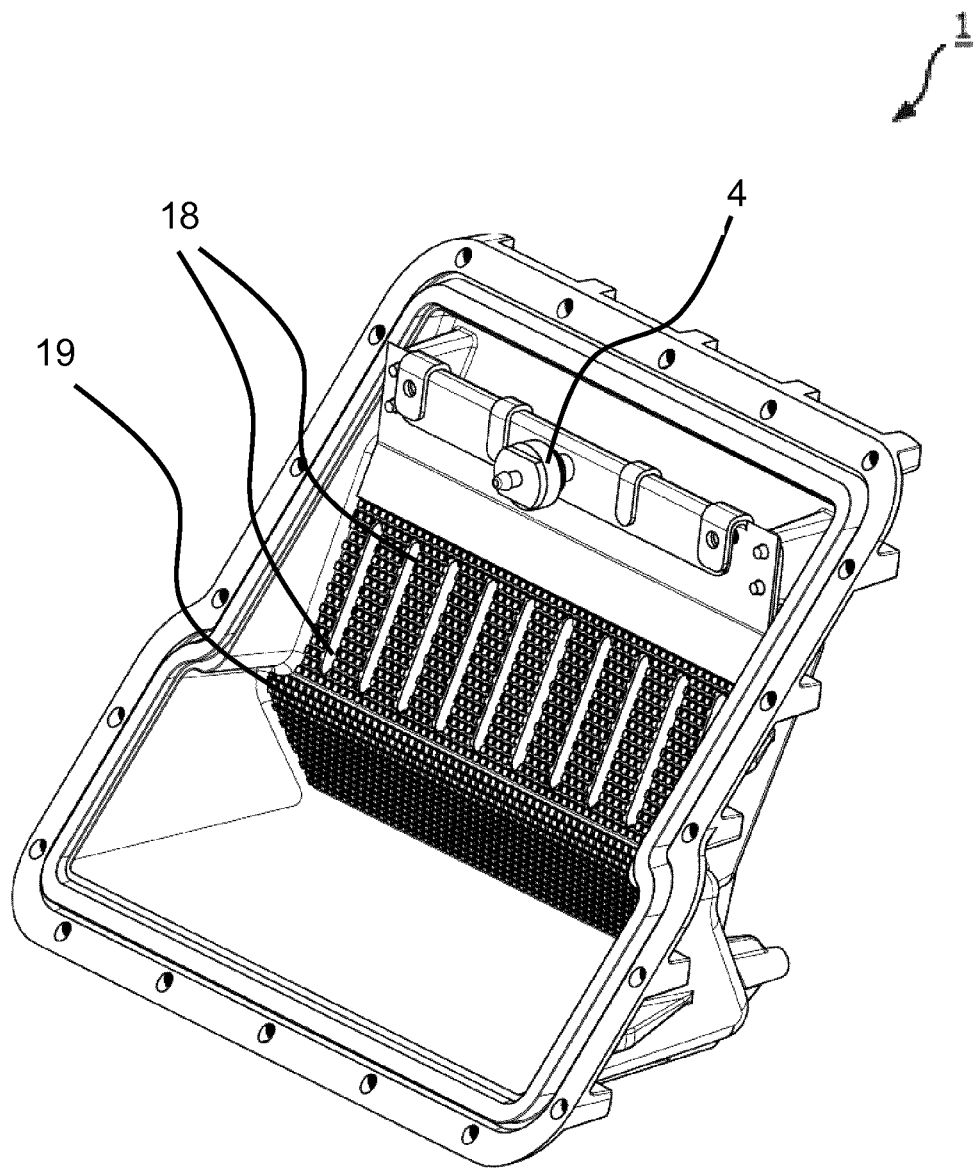
FIG. 5 shows an inside representation of a device according to the present invention.

The first plate (2) may have at least one channel (18) extending between the first upper end (2a) and the first lower end (2b), as illustrated in FIG. 5. The channel (18) may for example correspond to a groove, for example formed in a meshed element (19) covering the first plate (2) and/or the second plate (5). Preferably, the at least one channel (18) comprise a plurality of channels extending parallel, as illustrated.

When water is dispensed onto a heated first plate (2) it forms a film, the direction of travel of the film relative to the first plate (2) is determined by a combination of the surface tension of the water and gravity. The effect of surface tension can cause the water to migrate transversely across the first plate's surface so that separate rivulets gather and form a thicker film. The presence of channels prevents the water from running to one side and forming a thick rivulet (which requires the device to have a long evaporation length) if the device happens to be tilted during operation; the water is instead caused by gravity to travel down the channel and form a thinner film which will evaporate more quickly and use less energy than if a thicker film is allowed to form. Furthermore, the increased rate of evaporation means that the distance between the upper end (2a) and the lower end (2b) of the heated first plate (2) can be reduced for any given quantity of water dispensed.

The water inlet arrangement (4) may comprise multiple water inlets to dispense water onto multiple regions of the first plate (2) proximate said upper end (2a). The water being fed onto regions on the surface will cool the surface in those regions and will also cool any scale which has formed on the surface in those regions. Therefore, the scale will be cooled at different rates which will assist in inducing thermal shock which will act to break apart the scale.

The water inlet arrangement (4) may include one or more jet nozzles.

Alternatively, the water inlet arrangement may comprises a water distribution means (4b) to distribute water across a substantial width of the first plate. The water distribution means (4b) is for example a plate against which water exiting the jet nozzles (4a) gets into a direct contact.

FIG. 2 shows a cross-sectional side view of a device (1) for generating steam according to another embodiment of the present invention. Like features in this embodiment retain the same reference numerals.

As shown in FIG. 2 the first plate (2) and the second plate (5) may be joined to form a continuous structure or arrangement. The first plate (2) and the second plate (5) may be different portions of an integral structure, which may be referred to as a steaming element or a steam generator. The first plate (2) may refer to a first planar surface of the integral structure and the second plate (5) may refer to a second planar surface of the integral structure. The first plate (2) and second plate (5) may form a protrusion (7). The protrusion (7) is circled with dotted line on FIG. 2. The protrusion may have a curved tip as shown in FIG. 2 or a pointed tip (not shown).

FIG. 2 also illustrates the movement of scale flakes (8). Scale is formed on plate (2). As the water is cold relative to the heated surface (2), any scale on the plate (2) will be subjected to thermal shock. That is, the cooling effect of the water (at least until it evaporates) and the heating effect of the surface (2) will induce thermal stresses and strains in any scale that has formed on the surface (2) and cause it to break apart and dislodge from the surface of the first plate (2). The scale will then flake off as scale flakes (8) and travels either towards the protrusion formed by the first plate (2) and the second plate (5), and/or directly be projected on the collecting means (9). The movement of scale flakes (8) is illustrated by two arrows on FIG. 2.

The container (6) may comprise collecting means (9), such as a mesh, for retaining scale flakes (8) while allowing water to filter through. FIG. 2 shows a mesh (9). The collecting means (9) may also be referred to as a calc collecting means. However, it may be envisioned that the collecting means (9) may also be a perforated plate or a perforated sheet. The container (6) may have a portion that extends deep into the steam generator, i.e. at least below the first lower end (2b) to 'catch' the loose scale flakes (8) dislodged from the first plate (2).

The container (6) comprises a bottom portion (10) below the collecting means (9). The bottom portion (10) is for collecting the water. The bottom portion (10) may be enclosed along the sides of the bottom portion (10) to hold the water collected. FIG. 2 shows a collecting means (9) which is slightly distant from the bottom portion (10). However, it is understood that the collecting means (9) could be much closer or even in contact with the bottom portion (10). The device may further comprise a further heating element or a further heater (not shown in FIG. 2), which is adapted to generate steam from water collected by the container (6).

The heat which is necessary to generate steam from water collected by the container (6) may additionally or alternatively be provided by heating element (3a). The device may additionally or alternatively comprise a thermal conduction mechanism (not shown in FIG. 2) adapted to conduct heat to the container (6) from at least one of the heating element (3) and the first plate (2). In other words, the thermal conduction mechanism may be adapted to conduct heat from either the heating element (3) or the first plate (2) or both the heating element (3) and the first plate (2) to the container (6). The thermal conduction mechanism may be a intermediate structure or plate which conducts heat from the heating element (3) or the first plate (2) to the container (6). In one embodiment, the second plate (5) may be the conduction mechanism. The heating of water in container (6) may help generate more steam.

The second plate (5) allows for space between the first plate (2) and the container (6). A recess is formed between the protrusion and the container (6), which allows more space for the accumulation of scale flakes (8) and efficient scale collection (without increasing the size footprint of the steam generator). The scale flakes (8) falling in the scale flake pile have more possibility of getting redistributed, causing less obstruction for transport and collection of further scale flakes (8).

Figure 4A:
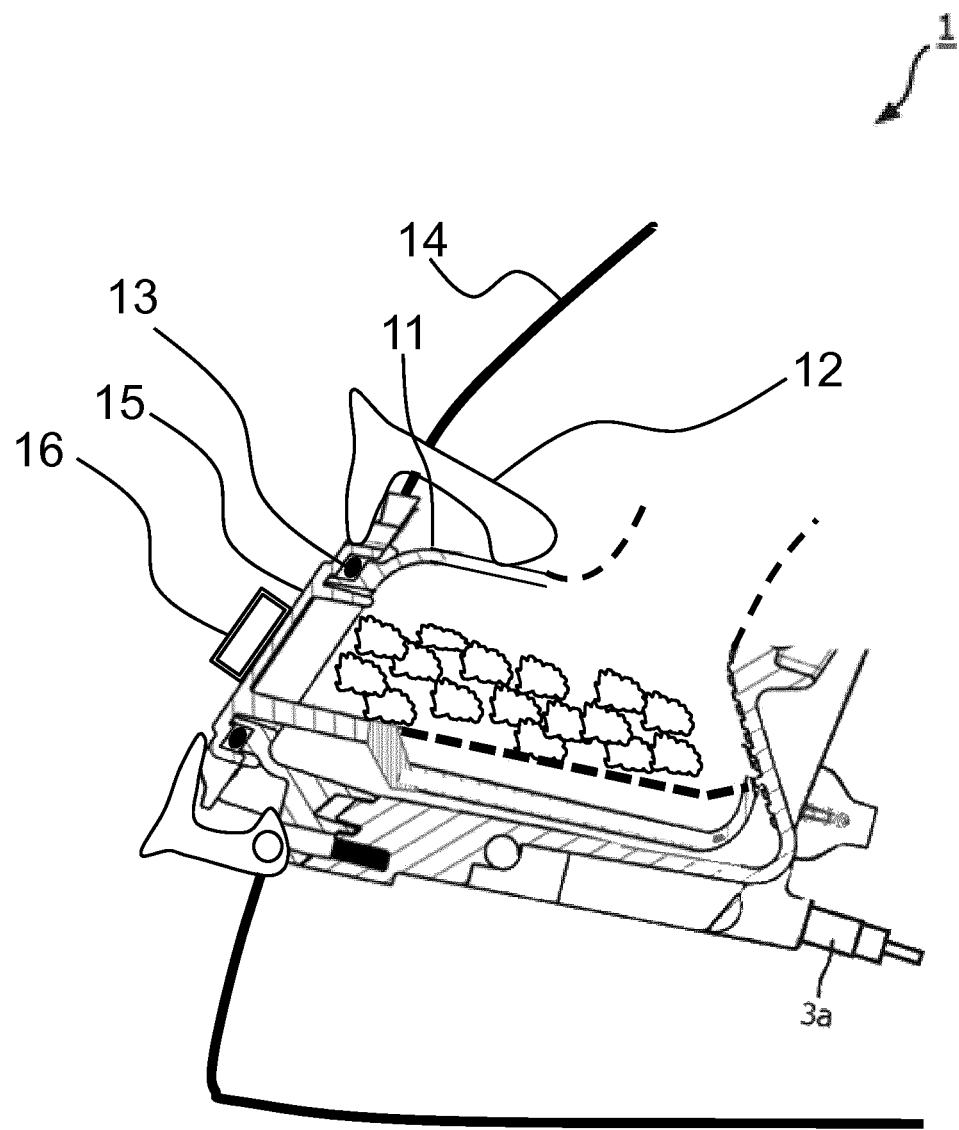
FIG. 4A and FIG. 4B show a device according to the present invention in two different situations.
Figure 4B:
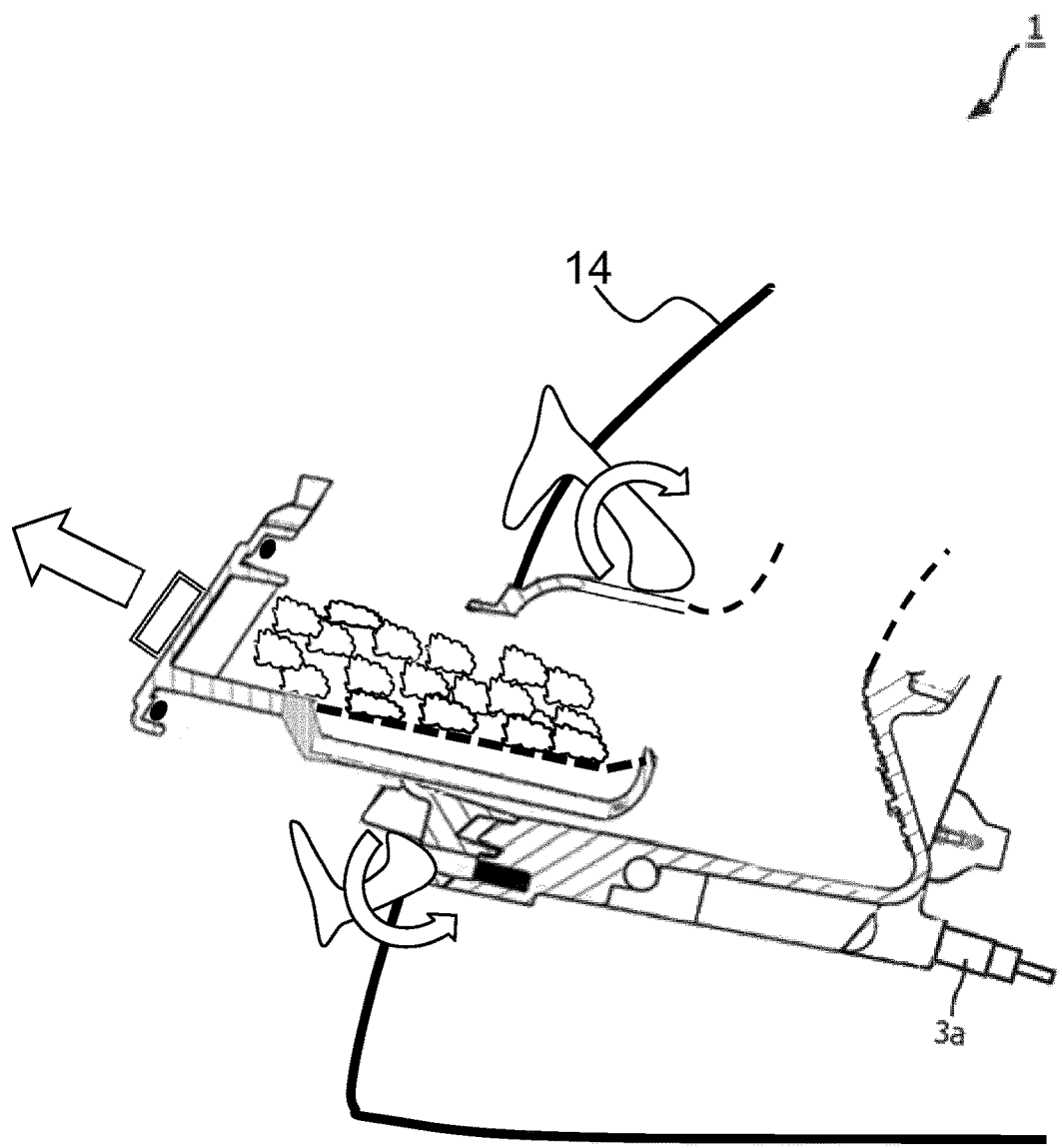

The container (6) may be removeable from the device (1). This aspect of the invention is illustrated in FIG. 4A and FIG. 4B, showing the container (6) attached to the device (1) and the container (6) detached from the device (1), respectively. To this end, the device may comprise an attachment mechanism (12) to reversibly attach the container (6) to the device (1). The attachment mechanism allows the container (6) to be attached to and be detached from the device (1) with ease. The attachment mechanism may further be adapted to seal the container (6) with said device (1) when the container (6) is attached to said device (1). For instance, the container (6) may include at least one (for example two, as illustrated) latch to secure the container (6) to the device (1) when the device (1) is in operation, i.e. when the plate (2) is being heated. The latch prevents the content, i.e. scale flakes (8), collected by container (6) from being exposed to the external environment during operation. Further, when the container (6) is latched to the device (1), the wall of the container (6) that is in contact with the external environment may be flush with an external surface of the device (1), thus sealing the container (6) with said device (1). The device (1) may further including a sealing mechanism (13) to further reduce leakage of water/steam when the container (6) is attached to the device (1). The sealing mechanism may be a seal around the wall of the container (6) that is being exposed to the external environment.

In order to increase or maximize the availability of steaming area (which is directly heated by heating element (3)), the container (6) may be attached to an outer cover (11) of the steam generator (1). The attachment mechanism and/or sealing mechanism may be at the outer cover (11). The sealing area of the container (6) may have a lower temperature, improving reliability of the seal against thermal degradation over time.

Preferably, the container (6) further comprises an exterior surface (15) with a handling mechanism (16), the handling mechanism being adapted to allow an user to remove the container from said appliance. The handling mechanism, e.g. a handle or a grip, allows the user to remove the container from the appliance with greater ease.

Preferably, the steaming appliance further comprises a housing (14), illustrated in FIG. 4A and FIG. 4B. The external surface (15) of the container (6) may be substantially flush with an outer surface of the housing (14) when the container (6) is attached to the device (1), as illustrated in FIG. 4A.

According to one aspect of the present invention, there is provided a steaming appliance (200) comprising a device (1) for generating steam as described above. For example, the steaming appliance (200) corresponds to a pressurized steam iron (also called pressurized steam generator), a garment steamer, or a steam iron.

Figure 6:
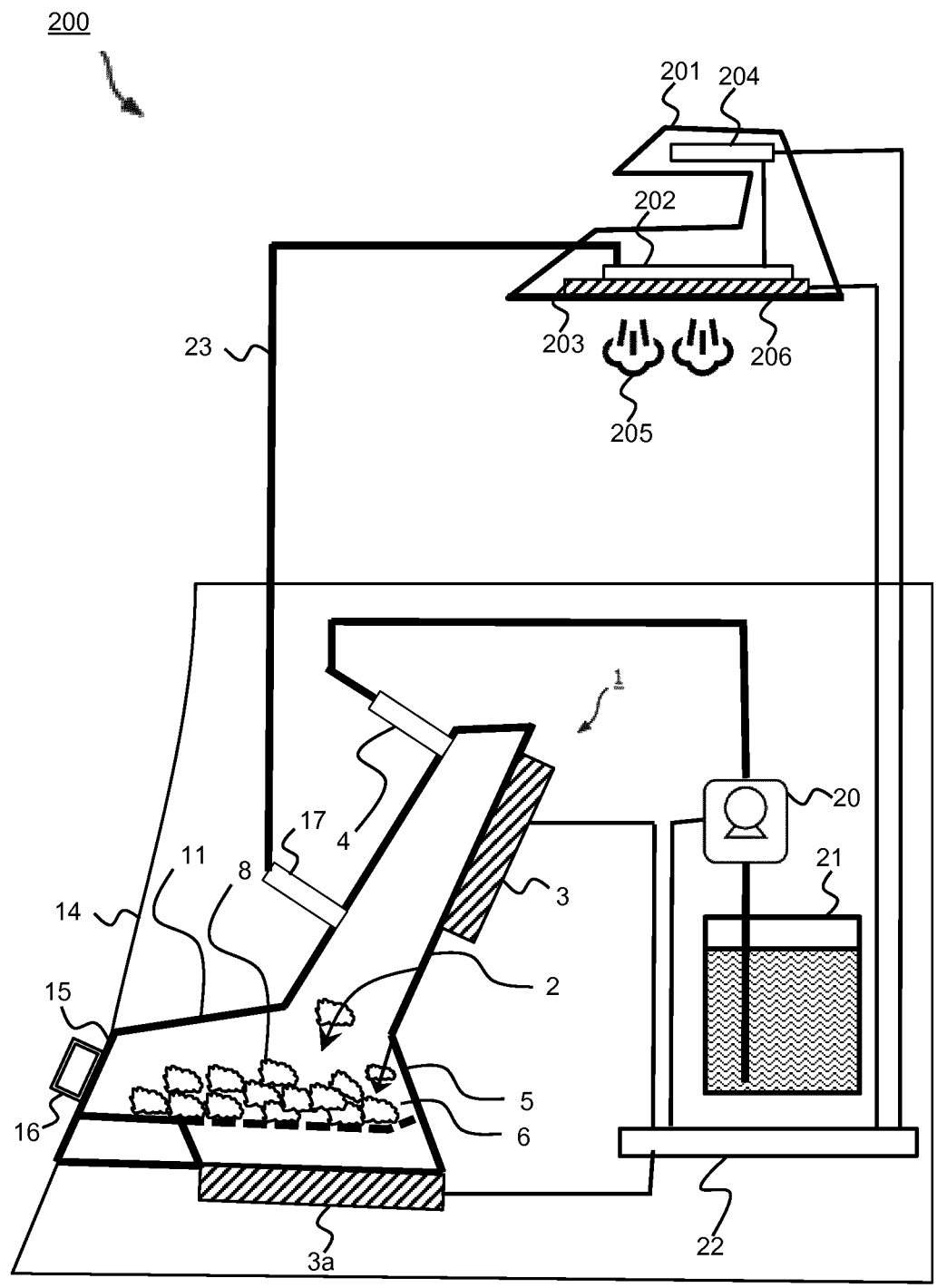
FIG. 6 shows a steaming appliance according to the present invention.

FIG. 6 illustrates a steaming appliance 200 which corresponds to a pressurized steam iron. The steaming appliance may comprise a water pump (20) to deliver water to said water inlet arrangement (4) from a water reservoir (21). The steaming appliance further comprises a first control unit (22) for controlling the water flow rate of the pump (20) in dependence on the predetermined temperature of the first plate (2). The first control unit (22) may also be used to regulate the electrical power delivered to the heating elements 3 and 3a to optimize the conversion of water into steam. The steaming appliance (200) also comprises a steam iron (201). A hose (23) connects the steam outlet (17) to a secondary steam chamber (202) arranged in the steam iron (201). The hose (23) is adapted to carry steam exiting the steam outlet (17). The secondary steam chamber (202) is heated by an additional heating element (203). The steaming appliance (200) also comprises a second control unit (204) to control the electrical power delivered to the secondary steam chamber (202) and the temperature of the secondary steam chamber (202), so that steam (205) generated by the soleplate (206) of the steaming appliance (200) has optimal characteristics in terms of temperature and/or steam rate for the treatment of garments. The second control unit (204) may also be connected to the first control unit (22) so that parameter of the steam generated by the device (1) can also be control from the steaming appliance (200). The steam iron (200) may be replaced by a garment steamer head (not shown) used to iron garments primarily by a flow of steam projected on garments. It is noted that In case the garment steamer head would not have a heated soleplate, this means that the garment steamer head does not embed a heating element (203). In that case, there is no need to control by the first control unit (22) any heating element in the garment steamer head.

Figure 3:
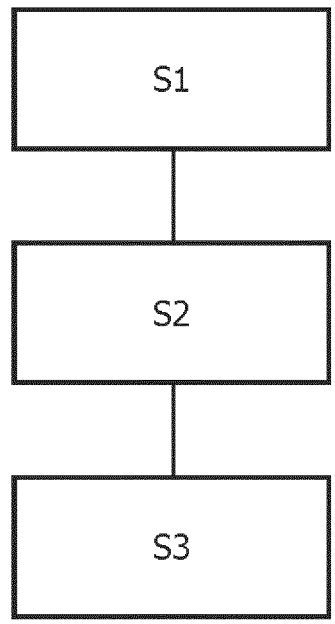
FIG. 3 is a flow diagram showing another aspect of the present invention.

FIG. 3 shows a flow diagram according to another aspect of the present invention. FIG. 3 shows a method of collecting scale flakes (8) in a device (1) for generating steam. The method comprises:

- in S1, heating a first plate (2) inclined at a positive first angle (A0) compared to the horizontal direction (H), the first plate (2) being heated to a predetermined temperature being at least above water evaporation temperature, the first plate (2) defining a first upper end (2a) and a first lower end (2b), the first lower end (2b) adjoining a second upper end (5a) of a second plate (5) that is inclined at a negative second angle (B0) compared to the horizontal direction (H);
- in S2, dispensing water on said first plate (2); and
- in S3, collecting in a container (6) the scale flakes (8), the container (6) extending at least below said first lower end (2b).

The first plate (2) and the second plate (5) forms an arrangement wherein the angle between the first plate (2) and the second plate (5) is less than 180°. Water is dispensed onto the first plate (2) which is heated. Steam is generated from the water dispensed on the heated first plate (2). Minerals in the water forms scale on the first plate (2). The repeated heating (when first plate (2) is heated) and cooling (when water is dispensed on the first plate (2)) causes the scale to flake off. The scale flakes (8) travels down the first plate (2) and fall off the protrusion formed by the first plate (2) and the second plate (5), into the container (6) positioned below the first lower end (2b).

The container (6) may include a collecting means (9) such as a mesh, a perforated plate, a perforated sheet or any suitable structure so that the scale flakes are retained on the collecting means (9). The water may flow through the collecting means (9) and into a bottom portion (10) of the container (6). The collected water may then be heated up to generate more steam.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the spirit and scope of the technique approaches of the present invention, which will also fall into the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. A device for generating steam, comprising:
   a first plate inclined at a positive first angle (A0) of less than 90 degrees above a horizontal reference (H), the first plate comprising a first upper end and a first lower end;
   a second plate inclined at a negative second angle (B0) of less than 90 degrees below the horizontal reference (H), the second plate comprising a second upper end and a second lower end, the second upper end and adjoining the first lower end to form a protrusion, wherein the horizontal reference (H) passes through the protrusion;
   a heating element to heat the first plate via conduction to a predetermined temperature for generating steam;
   a water inlet for dispensing water onto the first plate; and
   a container positioned below the protrusion and extending into a recess formed below the inclined second plate between the second upper end and the second lower end, the container being arranged for collecting scale flakes falling from the protrusion.

2. The device of claim 1, wherein the container comprises a mesh for retaining the scale flakes while allowing water to filter through.

3. The device of claim 1, wherein the container comprises one of a perforated pate or a perforated sheet for retaining the scale flakes while allowing water to filter through.

4. The device of claim 1, further comprising an additional heating element for generating steam from water collected by the container.

5. The device of claim 1, wherein the second plate is configured to conduct heat to the container from at least one of the heating element and the first plate.

6. The device of claim 1, wherein the container is removable, and wherein the device further comprises an attachment mechanism configured to reversibly secure the container in place.

7. The device of claim 6, wherein the attachment mechanism is further configured to seal the container with an outer surface of the device when the container is in place.

8. The device of claim 1, wherein the first plate has at least one channel extending between the first upper end and the first lower end.

9. The device of claim 1, wherein the water inlet comprises a water distributor configured to distribute water across a substantial width of the first plate.

10. A steaming appliance comprising:
    the device for generating steam according to claim 1; and
    a water pump configured to delivery water to the water inlet.

11. The steaming appliance according to claim 10, wherein the container comprises an exterior surface with a handling mechanism for removing the container from the steaming appliance.

12. The steaming appliance of claim 11, further comprising a housing, wherein the exterior surface of the container is flush with an outer surface of the housing.

13. A method of collecting scale flakes in a device for generating steam, the method comprising:
    heating a first plate with a heating element via conduction, the first plate inclined at a positive first angle (A0) of less than 90 degrees above a horizontal reference (H), and the first plate defining a first upper end and a first lower end, wherein the first lower end is adjoins a second upper end of a second plate that is inclined at a negative second angle (B0) of less than 90 degrees below the horizontal reference (H);
    dispensing water on the heated first plate; and
    collecting scale flakes falling from the first plate in a container positioned below the first lower end and extending from a location below the second upper end into a recess below the inclined second plate,
    wherein the horizontal reference (H) passes through a location at which the first lower end adjoins the second upper end.

14. The device of claim 1, wherein a magnitude of the negative second angle is less than a magnitude of the positive first angle.

* * * * *